United States Patent
Choi et al.

(10) Patent No.: US 8,607,327 B2
(45) Date of Patent: Dec. 10, 2013

(54) APPARATUS AND METHOD FOR SYNCHRONIZING SECURITY ASSOCIATION STATE IN MOBILE COMMUNICATION TERMINAL

(75) Inventors: Jong-Mu Choi, Gunpo-si (KR); Jin-Yup Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 733 days.

(21) Appl. No.: 12/490,738

(22) Filed: Jun. 24, 2009

(65) Prior Publication Data

US 2009/0328191 A1 Dec. 31, 2009

(30) Foreign Application Priority Data

Jun. 26, 2008 (KR) ........................ 10-2008-0060677

(51) Int. Cl.
  *H04L 29/06* (2006.01)
  *G06F 17/00* (2006.01)
  *G06F 15/16* (2006.01)
  *H04L 1/12* (2006.01)
(52) U.S. Cl.
  USPC ............................................ 726/14; 713/193
(58) Field of Classification Search
  USPC ........................................................ 726/14
  See application file for complete search history.

(56) References Cited

U.S. PATENT DOCUMENTS

2003/0018908 A1\* 1/2003 Mercer et al. .................. 713/193
2008/0222715 A1\* 9/2008 Bansal et al. .................... 726/11

FOREIGN PATENT DOCUMENTS

| EP | 1 852 999 A1 | 7/2007 |
| JP | 2002-344443 A | 11/2002 |
| KR | 10-2007-0122459 A | 12/2007 |
| KR | 10-2008-0050290 A | 6/2008 |

\* cited by examiner

*Primary Examiner* — Kambiz Zand
*Assistant Examiner* — Shiuh-Huei Ku
(74) *Attorney, Agent, or Firm* — Jefferson IP Law, LLP

(57) ABSTRACT

An apparatus and a method for synchronizing a Security Association (SA) state as SA information of a mobile communication terminal is lost are provided. In the method, an IPSec tunnel is established by performing an SA procedure with a server, and a secure port is obtained. A service request message is transmitted to the server via the obtained secure port, and an unsecure port is opened. When a service response message is received from the server, it is determined whether the service response message is received via the unsecure port. When the service response message is received via the unsecure port, the SA procedure is re-performed. Therefore, the terminal may use a service through a secure network without interruption, and reduce a waste of resources by avoiding unnecessary retransmission of a message for requesting a service.

15 Claims, 3 Drawing Sheets

APPARATUS AND METHOD FOR SYNCHRONIZING SECURITY ASSOCIATION STATE IN MOBILE COMMUNICATION TERMINAL

PRIORITY

This application claims the benefit under 35 U.S.C. §119 (a) of a Korean patent application filed in the Korean Intellectual Property Office on Jun. 26, 2008 and assigned Serial No. 10-2008-0060677, the entire disclosure of which is hereby incorporated by reference.

BACKGROUND OF THE INVENTION

1. Field of the Invention

The present invention relates to an apparatus and a method for synchronizing a Security Association (SA) state in a mobile terminal. More particularly, the present invention relates to a method and an apparatus for allowing a terminal to use a service through a secure network without interruption by immediately re-performing an SA procedure in the case where a server loses SA information of the terminal.

2. Description of the Related Art

Internet Protocol Security (IPSec) is a communication protocol that provides secure communication on the Internet, which is vulnerable to security breaches, and prevents illicit behavior such as wiretapping data by establishing a virtual private circuit via the Internet. Unlike a conventional security technique that provides security while an application layer transmits data, the IPSec protocol provides security while an IP layer transmits data.

The IPSec may be implemented in a terminal near a user. In a conventional method, a terminal implementing the IPSec establishes a tunnel according to the IPSec and transmits a data packet through the tunnel in order to provide a service (for example, an IP Multimedia Subsystem (IMS), Digital Video Broadcasting-Handheld (DVB-H), a Wireless Fidelity (WiFi)-based service, etc.) through a secure network. To use the IPSec, a Security Association (SA) procedure should be performed first. The SA procedure is a procedure that consults between ends about an IPSec protocol operating mode, a code algorithm, a code key communication method, etc. When the SA procedure ends, a terminal and a server may exchange data through a secure port of a tunnel established through the SA procedure.

Through the conventional SA procedure between the terminal and the server, SA information regarding the terminal is stored in a database of the server. However, in the conventional art, if the server loses the SA information of the terminal, the terminal cannot use a service through the secure network. Furthermore, when the SA procedure ends, the terminal operates an SA timer. Accordingly, when the server loses the SA information of the terminal, the terminal cannot use the service until the SA timer expires. In a worst case scenario, this may be one hour and thirty seconds. That is, the terminal must wait until the SA timer expires and then perform the SA procedure again with the server to reestablish the secure service. Also, the terminal must constantly transmit an INVITE message requesting a service to the server during an operating time of the SA timer, which causes a waste of resources due to unnecessary retransmission of a message by the terminal.

Accordingly there is a need for an apparatus and a method for synchronizing an SA state in the case where SA information of the mobile communication terminal is lost.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for synchronizing a Security Association (SA) state in the case where SA information of a mobile communication terminal is lost.

Another aspect of the present invention is to provide an apparatus and a method for allowing a terminal to use a service through a secure network without interruption by immediately re-performing an SA procedure in the case where a server loses SA information of the terminal.

Still another aspect of the present invention is to provide an apparatus and a method for avoiding unnecessary retransmission of a message generated as a terminal constantly transmits an INVITE message for requesting a service to a server by immediately re-performing an SA procedure in the case where the server loses SA information of the terminal.

According to an aspect of the present invention, a method for synchronizing an SA state of a mobile communication terminal is provided. The method includes establishing an Internet Protocol Security (IPSec) tunnel by performing an SA procedure with a server, obtaining a secure port with the server, transmitting a service request message to the server via the obtained secure port, opening an unsecure port with the server, when a service response message is received from the server, determining whether the service response message is received via the unsecure port and, when the service response message is received via the unsecure port, re-performing the SA procedure.

According to another aspect of the present invention, an apparatus for synchronizing an SA state of a mobile communication terminal is provided. The apparatus includes an application module for providing a service to a user by exchanging a service request message and a service response message with a server, a Transmission Control Protocol/Internal Protocol (TCP/IP) module for adding a TCP/IP header to data received from the application module to provide the data to an IPSec module, and for removing a TCP/IP header from data received from the IPSec module to provide the data to the application module, the IPSec module for establishing an IPSec tunnel by performing an SA procedure with the server, for obtaining a secure port, for exchanging data with the server via the obtained secure port, for applying a security service to data from the TCP/IP module to transmit the data to the server, and for releasing the security service from data from the server to transmit the data to the TCP/IP module and an IPSec extend module for controlling the IPSec module to open an unsecure port depending on a state of the IPSec tunnel and whether a service request message is transmitted, for determining whether a service response message from the server is received via the unsecure port, and for controlling the IPSec module to synchronize an SA state with the server depending on the determination result.

According to still another aspect of the present invention, an apparatus for synchronizing an SA state of a mobile communication terminal is provided. The apparatus includes a unit for establishing an IPSec tunnel by performing an SA procedure with a server, and for obtaining a secure port, a unit for transmitting a service request message to the server via the obtained secure port, a unit for opening an unsecure port, a unit for, when a service response message is received from the server, determining whether the service response message is received via the unsecure port and a unit for, when the service response message is received via the unsecure port, re-performing the SA procedure.

According to yet another aspect of the present invention, a method for synchronizing an SA state of a server is provided. The method includes establishing an IPSec tunnel by performing an SA procedure with a mobile communication terminal, establishing a secure port with the mobile communication terminal, storing SA information of the mobile communication terminal in a database, receiving a request message requesting a service from the mobile communication terminal via the secure port, establishing an unsecure port with the mobile communication terminal, determining whether the SA information of the mobile communication terminal exists in the database, when determining that the SA information of the terminal does not exist in the database, transmitting a response message via the unsecure port and when determining that the SA information of the terminal does exist in the database, transmitting a response message to the terminal via the secure port.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide an apparatus and a method for synchronizing a Security Association (SA) state in the case where SA information of a mobile communication terminal is lost.

Figure 1:
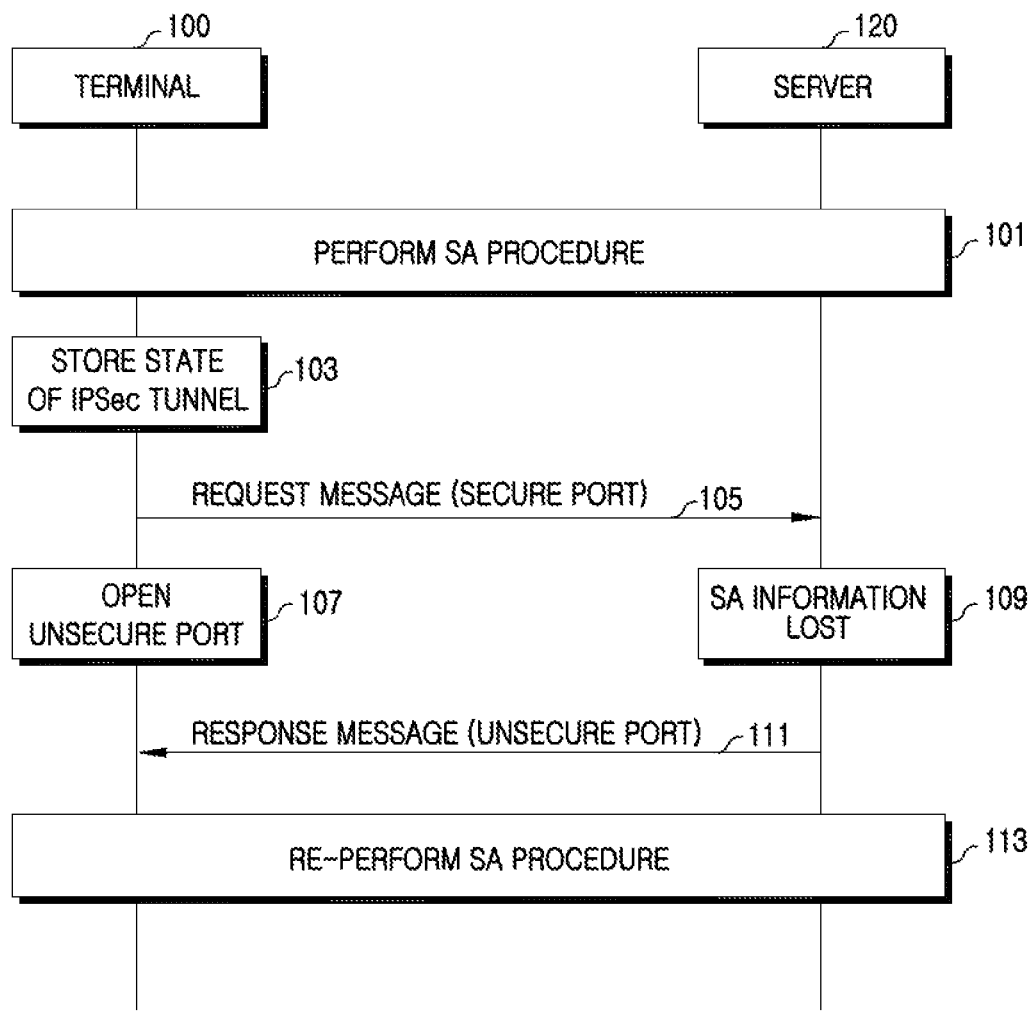
FIG. 1 is a view of a signal flow illustrating a method for synchronizing a Security Association (SA) state as SA information of a terminal is lost according to an exemplary embodiment of the present invention.

FIG. 1 is a view of a signal flow illustrating a method for synchronizing an SA state as SA information of a terminal is lost according to an exemplary embodiment of the present invention.

Referring to FIG. 1, in step 101, a terminal 100 establishes an Internet Protocol Security (IPSec) tunnel by performing an SA procedure with a server 120, and then obtains a secure port. At this point, SA information of the terminal 100 is stored in a database of the server 120.

In step 103, the terminal 100 stores the state of the IPSec tunnel, and in step 105, transmits a request message requesting a service to the server 120 via the obtained secure port. Here, the state of the IPSec tunnel becomes an on-state by the establishment of the IPSec tunnel.

In step 107, the terminal 100 determines that the state of the IPSec tunnel is an on-state and a request message has been transmitted, opens an unsecure port, and maintains a listen state with respect to the open unsecure port and the secure port.

When receiving the request message from the terminal 100, the server 120 determines whether the SA information of the terminal 100 exists in the database. When determining that the SA information of the terminal 100 does not exist in step 109, for example, when determining that the SA information of the terminal 100 is lost, the server 120 transmits a response message to the terminal 100 via the unsecure port informing that processing of the request message is impossible in step 111. On the other hand, when the server determines that the SA information of the terminal 100 exists in the database (not shown), the server 120 normally processes the request message of the terminal 100 using the relevant SA information, and transmits a response message thereto to the terminal 100 via the secure port (not shown).

At this point, the terminal 100 may estimate an SA state with the current server by determining a reception path of the response message. That is, the terminal 100 determines if the response message has been received via the unsecure port. If the response message has been received via the unsecure port, the terminal considers that an SA with the server 120 has ended, and in step 113, re-performs an SA procedure with the server 120. On the other hand, if the terminal determines that the response message has been received via the secure port, the terminal 100 processes the received response message (not shown).

Figure 2:
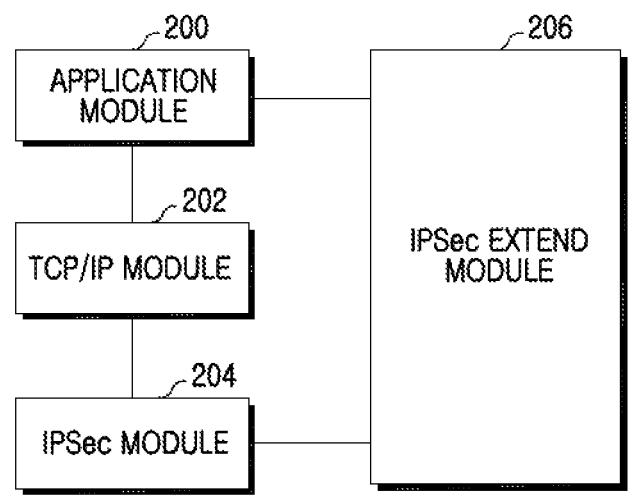
FIG. 2 is a block diagram illustrating an apparatus for synchronizing an SA state of a terminal according to an exemplary embodiment of the present invention.

FIG. 2 is a block diagram illustrating an apparatus for synchronizing an SA state of a terminal according to an exemplary embodiment of the present invention.

As illustrated, the apparatus for synchronizing the SA state of the terminal includes an application module 200, a TCP/IP module 202, an IPSec module 204, and an IPSec extend module 206.

Referring to FIG. 2, the application module 200 provides an interface unit with a user. Also, the application module 200 provides a service to the user by exchanging a service request message and a response message with a server.

The TCP/IP module 202 serves as a communication module for connecting networks having different physical characteristics with one another. The TCP/IP module 202 adds a TCP/IP header to data received from the application module 200 to provide the data to the IPSec module 204, and removes a TCP/IP header from data received from the IPSec module 204 to provide the data to the application module 200.

The IPSec module 204 establishes an IPSec tunnel by performing an SA procedure with the server, obtains a secure port, and exchanges data with the server via the obtained secure port. Also, the IPSec module 204 applies a security service to data received from the TCP/IP module 202 to transmit the data to the server, and releases a security service from the data received from the server to transmit the data to the TCP/IP module 202.

The IPSec extend module 206 manages the states of the IPSec module 204 and the application module 200, and accordingly, controls the IPSec module 204. In other words, the IPSec extend module 206 determines the state of the IPSec tunnel by performing an SA procedure with the server, and the state of the application module 200 by transmitting a request message to the server, and accordingly, controls the IPSec module 204 to open an unsecure port and listen to the unsecure port. Also, the IPSec extend module 206 estimates an SA state with the server by determining a reception path (secure port or unsecure port) of a response message, and accordingly, controls the IPSec module 204 to synchronize an SA state with the server.

Figure 3:
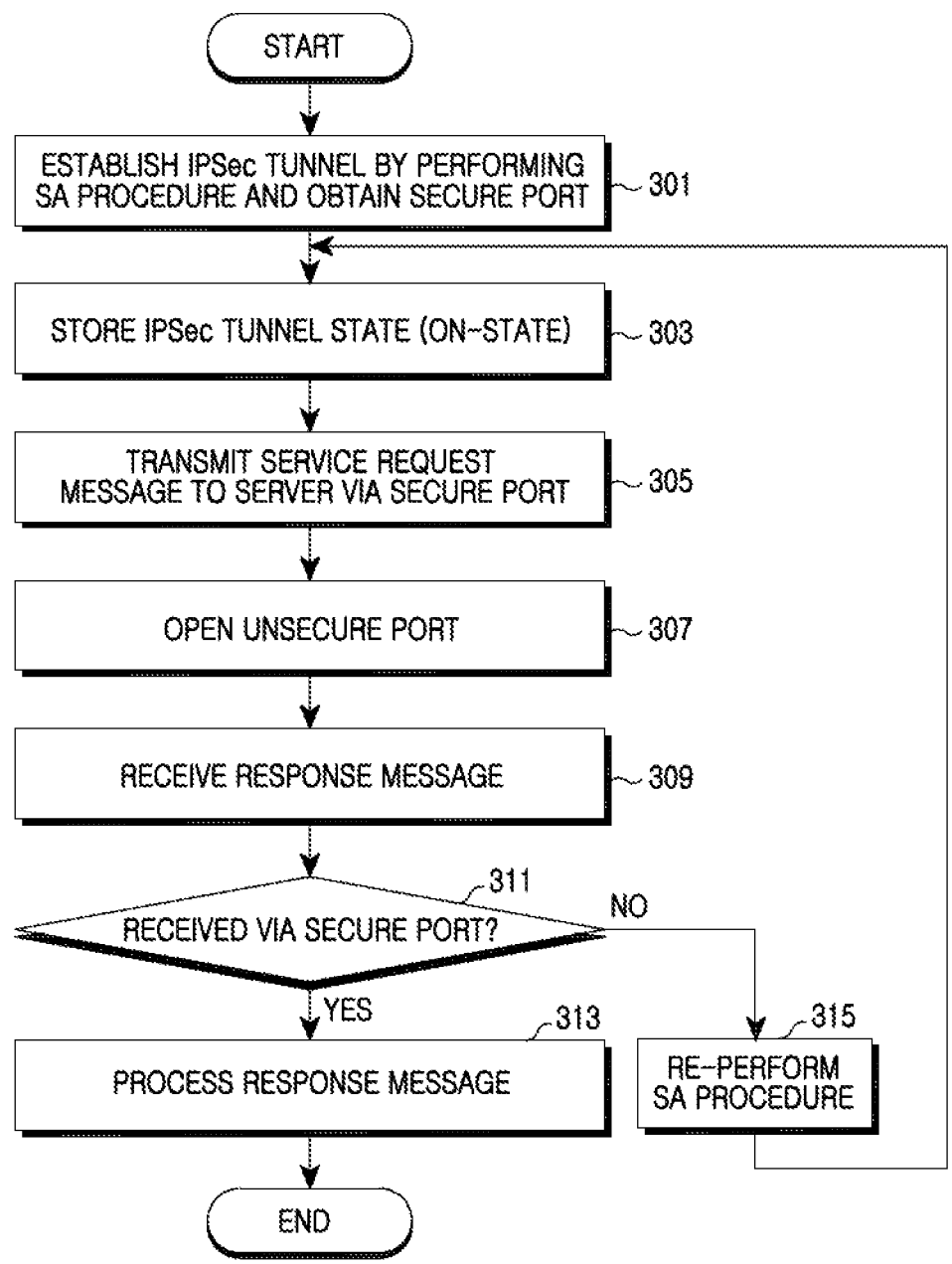
FIG. 3 is a flowchart illustrating a method for synchronizing an SA state as SA information of a terminal is lost according to an exemplary embodiment of the present invention.

FIG. 3 is a flowchart illustrating a method for synchronizing an SA state as SA information of a terminal is lost according to an exemplary embodiment of the present invention.

Referring to FIG. 3, in step 301, the terminal establishes an IPSec tunnel by performing an SA procedure with a server, and obtains a secure port. In step 303, the terminal stores the state of the IPSec tunnel, and in step 305, transmits a request message requesting a service with the server via the obtained secure port. Here, the state of the IPSec tunnel becomes an on-state by the establishment of the IPSec tunnel.

In step 307, the terminal determines that the state of the IPSec tunnel is an on-state and that a request message has been transmitted, opens an unsecure port, and maintains a listen state with respect to both the open unsecure port and the secure port.

In step 309, the terminal receives a message from the server in response to the request message sent to the server. When the request message is normally processed by the server, the response message is transmitted to the terminal via the secure port. On the other hand, when the server loses the SA information of the terminal or otherwise no longer has the SA information of the terminal, the response message is transmitted to the terminal via the unsecure port. Therefore, the terminal may estimate the SA state with the current server by determining the reception path of the response message.

In step 311, the terminal determines whether the response message is received via the secure port in order to estimate an SA state with the server. When the response message is received via the secure port, the terminal processes the received response message in step 313. On the other hand, when the response message is received via the unsecure port, the terminal considers an SA with the server has ended, re-performs an SA procedure with the server in step 315, and returns to step 303 to perform subsequent steps. Therefore, the terminal may avoid unnecessarily waiting until an SA timer expires even when SA has ended and thus avoid a user inconvenience.

After that, the terminal ends the algorithm according to an exemplary embodiment of the present invention.

As described above, according to an exemplary embodiment of the present invention, in the case where a server loses SA information of a terminal, an SA procedure is immediately performed again, so that the terminal may use a service via a secure network without interruption and thus a user's satisfaction increases. Also, an exemplary embodiment of the present invention may avoid unnecessary retransmission of a message generated when the terminal constantly transmits an INVITE message for requesting a service to the server, and thus reduce a waste of resources.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for synchronizing a Security Association (SA) state of a mobile communication terminal, the method comprising:
    establishing an Internet Protocol Security (IPSec) tunnel by performing an SA procedure with a server;
    obtaining a secure port with the server;
    transmitting a service request message to the server via the obtained secure port;
    when the secure port is open, opening an unsecure port with the server;
    maintaining a listening state on both the secure port and the unsecure port;
    when a service response message is received from the server, determining whether the service response message is received via the unsecure port; and
    when the service response message is determined to be received via the unsecure port, re-performing the SA procedure.

2. The method of claim 1, further comprising, when the service response message is received via the secure port, processing the received service response message.

3. The method of claim 1, further comprising storing a state of the IPSec tunnel.

4. The method of claim 3, wherein the state of the IPSec tunnel comprises an on-state upon establishment of the IPSec tunnel.

5. The method of claim 4, wherein the opening of the unsecure port with the server comprises determining that the state of the IPSec tunnel comprises the on-state.

6. An apparatus for synchronizing a Security Association (SA) state of a mobile communication terminal, the apparatus comprising:
    at least one processor for processing one or more modules, the one or more modules including:
        an application module for providing a service to a user by exchanging a service request message and a service response message with a server;
        a Transmission Control Protocol/Internal Protocol (TCP/IP) module for adding a TCP/IP header to data received from the application module to provide the data to an Internal Protocol Security (IPSec) module, and for removing a TCP/IP header from data received from the IPSec module to provide the data to the application module;

the IPSec module for establishing an IPSec tunnel by performing an SA procedure with the server, for obtaining a secure port with the server, for exchanging data with the server via the obtained secure port, for applying a security service to data from the TCP/IP module to transmit the data to the server, and for releasing the security service from data from the server to transmit the data to the TCP/IP module; and an IPSec extend module for controlling the IPSec module to open an unsecure port depending on a state of the IPSec tunnel and on whether a service request message is transmitted and to maintain a listening state on both the secure port and the unsecure port, for determining whether a service response message from the server is received via the unsecure port, and for controlling the IPSec module to synchronize an SA state with the server depending on the determination result.

7. The apparatus of claim 6, wherein, when the service response message is received via the unsecure port, the IPSec extend module controls the IPSec module to re-perform the SA procedure.

8. The apparatus of claim 6, wherein when the service response message is received via the secure port, the IPSec extend module controls the IPSec module to process the received service response message.

9. The apparatus of claim 6, wherein the IPSec extend module determines a state of the IPSec tunnel.

10. The apparatus of claim 9, wherein the state of the IPSec tunnel comprises an on-state upon establishment of the IPSec tunnel.

11. The apparatus of claim 10, wherein the IPSec extend module controls the IPSec module to open the unsecure port with the server after determining that the state of the IPSec tunnel comprises the on-state.

12. An apparatus for synchronizing a Security Association (SA) state of a mobile communication terminal, the apparatus comprising:

at least one processor for processing one or more units, the one or more units including:

a unit for establishing an Internet Protocol Security (IPSec) tunnel by performing an SA procedure with a server and for obtaining a secure port;

a unit for transmitting a service request message to the server via the obtained secure port;

a unit for opening, when the secure port is open, an unsecure port;

a unit for maintaining a listening state on both the secure port and the unsecure port;

a unit for, when a service response message is received from the server, determining whether the service response message is received via the unsecure port; and a unit for, when the service response message is determined to be received via the unsecure port, re-performing the SA procedure.

13. The apparatus of claim 12, further comprising a unit for, when the service response message is received via the secure port, processing the received service response message.

14. The apparatus of claim 12, further comprising a unit for storing a state of the established IPSec tunnel, wherein the unit for opening the unsecure port opens the unsecure port when the state of the IPSec tunnel is an on-state and the service request message has been transmitted.

15. A method for synchronizing a Security Association (SA) state of a server, the method comprising:

establishing an Internet Protocol Security (IPSec) tunnel by performing an SA procedure with a mobile communication terminal;

establishing a secure port with the mobile communication terminal;

storing SA information of the mobile communication terminal in a database;

receiving a request message requesting a service from the mobile communication terminal via the secure port;

when the secure port is open, establishing an unsecure port with the mobile communication terminal;

determining whether the SA information of the mobile communication terminal exists in the database;

when determining that the SA information of the terminal does not exist in the database, transmitting a response message via the unsecure port; and when determining that the SA information of the terminal does exist in the database, transmitting a response message to the terminal via the secure port.

\* \* \* \* \*